United States Patent [19]
Blüm

[11] 3,931,841
[45] Jan. 13, 1976

[54] METHOD OF COMMINUTING TREE STUMPS

[76] Inventor: Hans Blüm, Siegfriedstrasse 14, 6841 Bobstadt, Germany

[22] Filed: Aug. 9, 1974

[21] Appl. No.: 496,440

Related U.S. Application Data

[62] Division of Ser. No. 313,067, Dec. 7, 1972, Pat. No. 3,868,980.

[30] Foreign Application Priority Data

Mar. 21, 1972 Germany............................ 2213667

[52] U.S. Cl............... 144/309 R; 83/928; 144/2 N; 241/101.7; 241/277; 241/293
[51] Int. Cl.².................. B27M 1/00; A01G 23/08; B27C 9/01; B27G 13/04
[58] Field of Search........ 144/2 N, 2 R, 309 R, 3 R, 144/34 R; 83/928; 241/101.7, 191, 19 S, 277, 293

[56] References Cited
UNITED STATES PATENTS

| | | | |
|---|---|---|---|
| 1,312,450 | 8/1919 | McKay et al. | 144/2 N |
| 3,198,224 | 8/1965 | Hiley | 144/2 N |
| 3,308,860 | 3/1967 | De Shano | 144/2 N |
| 3,625,267 | 12/1971 | Welborn | 241/101.7 X |
| 3,685,557 | 8/1972 | Groce | 144/2 N |
| 3,732,905 | 5/1973 | Pickel | 144/2 N |

*Primary Examiner*—Frank T. Yost
*Assistant Examiner*—W. D. Bray
*Attorney, Agent, or Firm*—John J. Byrne; Edward E. Dyson

[57] ABSTRACT

Method and apparatus for comminuting a tree stump in its entirety while still rooted in the ground, utilizing a large, heavy cylindrical roller or drum rotating at high speed and having cutters mounted on a peripherical surface thereof for engaging and comminuting the stump from the side thereof. The roller is journaled for rotation about a horizontal axis in a carrier attached to the front end of a heavy four-wheel vehicle which is driven hydraulically over the ground surface from a selfcontained power source such as an internal combustion engine. The hydraulic system which drives the vehicle also includes a hydraulic motor mounted on the carrier for rotating the roller. The roller, through the carrier, is mounted to the vehicle frame for swinging movement in a vertical plane relative to the ground and a hydraulic cylinder included in the hydraulic circuit is provided for effecting said vertical swinging movement. Controls for operating the cutting roller and the vehicle are provided in an operator's cab on the vehicle.

14 Claims, 13 Drawing Figures

METHOD OF COMMINUTING TREE STUMPS

This application is a division of my copending application Ser. No. 313,067 filed Dec. 7, 1972, now U.S. Pat. No. 3,868,980.

BACKGROUND OF INVENTION

This invention relates to an improved method and apparatus for comminuting tree stumps and buried roots while in the ground surface.

In one conventional land clearing operation, tree stumps remaining after felling trees are lifted out of the ground and moved to the side by means of tracked vehicles or other suitable apparatus where they are left to rot or be transported away to a dump or other disposal area. This procedure has considerable disadvantages. If the tree stumps remain at a collection point, they take up space which thus becomes unusable. Transporting the tree stumps away involves additional cost for labor and vehicles. If the stump is moved aside from its original, rooted position it causes simultaneous removal of valuable top soil which is necessary in situations where trees are to be replanted in the cleared area. In addition, when the hole caused by removal of the stump, is filled, top soil is moved deep into the ground where it is useless for new plantings, while conversely a larger quantity of uncultivated soil, such as clay and sand without humus, is brought to the surface. Uprooting of the tree stumps may also result in severe damage to the root system which is important in situations where the cleared land is to be replanted for growing new trees. The aforementioned conventional practice also places a greater load on waste disposal areas which are already severely overcrowded.

In another conventional practice of stump removal, the stumps are uprooted and burned on site.

This is not only costly and dangerous from the standpoint of fire prevention but furthermore, the products of combustion polute the air and add to the ecology problem which today is so very urgent. Already in some areas laws and regulations have been passed restricting burning operations in an effort to increase fire safety as well as to reduce air pollution. Such restricted burning conditions still do not entirely solve the pollution problem and in any event, make stump removal by burning a slow and expensive operation.

In an attempt to overcome these disadvantages, various methods and apparatus have been developed to comminute tree stumps rooted in the ground. For example U.S. Pat. No. 1,312,450 discloses a milling apparatus for cutting tree trunks employing a rotating milling roller lowered onto the top of the stump for milling the wood of the stump away. However, with this patented apparatus, the milling process can be conducted only to a limited extent below the ground surface and as a result, the entire stump cannot be removed. Moreover in order to mill below the surface with this patented device, a milling roller which is wider in diameter in the middle must be used such that it is not possible to touch the lateral roots. Thus, during subsequent new cultivation or re-plantings, the place where the stump stood, as well as its immediate surrounding area, cannot be planted. In situations where the cleared land is not to be used for re-planting trees, the method and apparatus disclosed in U.S. Pat. No. 1,312,450 is still believed to be inadequate for commercial purposes because it involves cutting across the grain of the stump on the upper surface of the stump which requires excessive drum pressure and speed and moreover takes a relatively long time to cut through the entire stump. It also requires that the knives be sharpened very frequently. Furthermore it is doubted that the long knives used on this patented device would permit continuous rotation of the drum through the stump, but instead would cause periodic binding heaving or stoppage of the drum particularly when great pressure is exerted on the stump. Another serious deficiency with this patented device is that it cannot cut the stump below the ground surface because the drum bearing and pulley transmission system prevents it and would be subject to damage. Moreover soil would build up behind the knives preventing effective cutting action. Finally with respect to U.S. Pat. No. 1,312,450 it is noted that it discloses a very complicated and cumbersome mechanism for pressing the drum on the stump as the cutting operation proceeds.

Other prior art cutting method and apparatus which attempt to comminute stumps by cutting across the grain on the top surface of the stump, are also disclosed in U.S. Pat. Nos. 3,044,509 and 3,389,726. Additionally, these patented devices also cannot remove the entire stump because the distance the cutting roller can move below the ground surface is limited by the drum bearings and drive transmission. Furthermore the great weight required to effectively comminute a stump, particularly when cutting across the grain by rotating across the top face of the stump, is believed to be lacking from these patented devices. Moreover it has been discovered by applicant that an exceedingly high drum speed is required for effective comminution which if applied to the belt drive system disclosed in these patents, would cause periodic damage thereto, particularly since a great deal of vibration is encountered in comminuting a tree stump. The possibility of damaging such a conventional drive transmission is increased if the drum is operated below the ground surface.

It has further been discovered by applicant herein that it is difficult to maintain the cutting roller properly positioned on a tree stump when using a conventional arrangement of knives on the drum such as disclosed in U.S. Pat. Nos. 3,389,726 and 3,044,509. Moreover the spiral arrangement of the roller knives disclosed in U.S. Pat. No. 3,389,726 would cause the drum to "walk" laterally off the stump to frustrate the cutting operation. It is further noted that the cutting rollers disclosed in U.S. Pat. Nos. 3,044,509 and 3,389,726 are hitched to the rear of a vehicle so that any stumps or other obstacles encountered below the rear of the vehicle or under the hitch, could prevent proper contact of the drum with the stump to be removed. It would, of course, also hinder the manueverability of the vehicle and the drum.

Another known device for cutting tree stumps while rooted in the soil, is disclosed in German Pat. No. 1,945,388 (Gebrauchsmuster) and includes a milling disc equipped with cutting knives, with the axis of rotation of the disc extending in the same direction as the length of the vehicle. The disc is attached to the rear of a vehicle, and is lowered partially into the ground in front of the stump and then the disc is moved against the stump. However, the working depth and especially the height of tree stumps which can be attacked, are limited by the diameter of the milling disc. The milling disc engages the stump only in its lower reaches, so that considerable lateral forces are exerted upon the vehicle which tend to overturn the vehicle. The soil and wood are thrown off laterally, without filling the hole produced by the cutting operation. Since the cutting forces on the tree stump are primarily horizontal, the stump tends to move laterally away from the cutter disc. In the vicinity of the disc axis, where the largest quantity of wood must be broken up, the cutting speed is too slow for effective cutting of the wood. Applicant is familiar with this device being one of the coinventors named in said German Patent.

Another device employing cutter discs is shown in U.S. Pat. No. 3,625,267 which also involves a relatively slow process of cutting stumps and suffers from some of the same draw-backs mentioned above in connection with the above-cited German Patent. This device must make numerous vertical cuts in the stump in order to entirely remove the stump. Moreover, the bearings for the cutter discs and the chain drive are prone to damage since they directly engage the stump. The damage is enhanced when operating below the ground surface.

In addition to the shortcomings of prior patented devices summarized above, applicant has discovered that the roller knives of the prior art particularly those employing extremely hard material, such as carbide material, are prone to chipping and breakage upon encountering the tough, hard material of the stump with great impact. Also, constant sharpening of the roller knives is required which considerably slows the overall stump removal operation. Furthermore applicant has discovered that in order to obtain a balanced cutter drum which will not wander or walk off the stump or heave or stop during operation when pressure is applied to the stump, it is important to position the knives in a certain manner here-to-fore lacking from the prior art.

In summary, applicant believes that none of the prior art devices are adequate for continuous commercial use over long periods in removing entire tree stumps.

OBJECTS OF INVENTION

It is an object of the present invention to provide an improved method and apparatus for quickly and efficiently comminuting entire tree stumps while rooted in the ground. Included herein is the provision of such method and apparatus suitable for use in continuous commercial land clearing operations so as to avoid stump burning or hauling the stump to a dump or disposal areas, in keeping with the current ecology drive. Further included herein is the provision of such a method and apparatus which are free of the disadvantages noted above in connection with prior art devices and methods.

A further object of the present invention is to provide such method and apparatus which may be controlled by a single person.

A further object of the present invention is to provide such a method and apparatus which utilizes a cylindrical cutter roller or drum with knives thereon. Included herein is the provision of a novel and improved cutter roller having a unique arrangement of knives which moreover are adjustable on the drum and may be easily removed and replaced if desired.

Another object of the present invention is to provide a novel knife assembly which may be incorporated on the cutter roller described above.

A still further object of the present invention is to provide a novel self-powered vehicle incorporating the aforesaid cutter roller. Included herein is the provision of an improved mechanism for mounting the cutter roller with respect to the front of the vehicle and an improved mechanism for driving the cutter drum at high speed.

SUMMARY OF INVENTION

In practicing the method of the invention, a heavy cutting or milling roller or drum, attached to the front end of a heavy vehicle is partly sunk into the ground in front of a stump. During or subsequent to the latter step, the vehicle is driven toward the stump to engage the side of the stump. Cutting knives, provided throughout the periphery of the milling roller engage and attack the stump while moving primarily from the top toward the bottom portions of the stump so as to cut or slice chips from the stump generally along the grain of the wood. During the wood chipping operation, the roller is rotated at high speed for example 200 revolutions per minute and is advanced with great pressure against the stump laterally and downwardly thereof.

Advancement of the cutter roller against the stump as the comminuting progresses is achieved by driving the vehicle towards the stump simultaneously with operating the cutting roller. Additionally, and depending on the depth of the stump below the ground surface, the cutter roller may be lowered further into the ground as the cutting operation proceeds to ensure entire comminution of the stump and its immediate roots. Thus, the stump and roots immediately surrounding it, will be chipped to the desired depth which can be chosen in accordance with the depth of the respective re-plantings in cases where the cleared area is to be used for such.

After the stump is removed, there remains a loosened soil area primarily consisting of top soil and for a lesser part, wood chippings from the stump. The attack of the cutting knives from top to bottom in the direction of the wood fiber brings about an effective breaking up or chipping of the stump so that no excessively large wood pieces remain which might otherwise present an obstacle during a new planting or cultivation of the ground. In situations where the cleared land is to be used for building sites, the entire stump is removed by using the method of the present invention.

When comminuted by the method and apparatus of the present invention, the stump cannot avoid the attack of the knives by shifting sideways or laterally. Under the impact of knife attack from above, the stump presses with its roots against the soil, so that even hard types of wood such as oak can be broken up or comminuted in relatively loose or soft soil. The reaction forces created by the cutting act upon the vehicle vertically, and not horizontally, so that there is very little tendency, if any, for the vehicle to shift to either side of or away from the stump. The wood and soil picked up by the cutting knives are thrown downward and to the rear of the vehicle, and largely stay in the space vacated by the stump. Subsequent levelling work, if any is indeed required, can thus be limited to a minimum.

To avoid chipping or braking of the roller knives when encountering the tough stump material upon impact, spring steel is employed in forming the knives in accordance with the present invention. Such steel may also include a certain amount of Selesium to increase its toughness. The knives are made of a sufficient size such as 2 and ⅜ inches wide and ⅝ of an inch thick with bevel cutting edges. In order to achieve a balanced cutter roller which will not walk laterally off the stump or stop or heave during the cutting operation, the knives are placed on the drum in predetermined angular positions. Additionally the knives are arranged in a staggered pattern throughout the circumference of the drum to ensure that the stump will be cut throughout the entire axial length of the drum at least once upon each revolution of the drum.

To facilitate mounting and removal of the knives on the cutting drum, a novel holder assembly is provided for each of the knives in accordance with a preferred embodiment of the present invention. This assembly permits quick adjustment or removal and replacement of the knives.

The cutter roller is placed on a carrier pivotally mounted to the front of the vehicle and which can swing vertically under the driving force of an associated hydraulic cylinder. The carrier and cutting roller are so related such that a plane passing through the base of the carrier stands at an angle to a vertical axis passing through the center of the roller when the roller is in uppermost position. In other words, the carrier is located in the upper rear quadrant of the roller. With this relationship, a substantial portion of the front quadrants of the roller are exposed for contact with the stump.

In operation the cutter roller can be brought to the desired depth immediately in front of the tree stump, and after initial chipping of the tree stump, can be raised and then lowered against the tree stump to continue the comminuting operation as described. The drive motor for the cutting roller is placed on the carrier immediately above the roller and is connected to the roller by a variable speed-gear-unit. This eliminates the need for conventional driving connections since the roller and its drive motor are both mounted to the carrier.

In order to enable the roller to effectively comminute the stump below the ground surface, the ends of the cutting roller are recessed. The recesses house the roller bearings, and on one side, a portion of the gear transmission connected to the roller drive motor. Hence, the bearings and drive connections are protected and do not interfere with movement of the roller below the ground surface.

In accordance with another aspect of the present invention, the driving motor for the roller is a variable speed hydraulic motor which is driven by a pump suitably mounted to the frame of the vehicle. The hydraulic motor not only provides the requisite high cutter drum speed up to and over 200 revolutions per minute, but also it may be attached very simply and directly to the carrier for the drum because of its small dimension, low weight, and the use of flexible conduits, so that the required height mobility of the drum is not restricted.

The hydraulic control system for operating the hydraulic motor for the cutting drum and the hydraulic cylinder for raising and lowering the same, is included in a hydraulic system also used to drive the vehicle over the ground surface. In the preferred embodiment, the vehicle is steered through its rear wheels by means of a hydraulic cylinder included in the hydraulic system. The controls for operating the vehicle as well as the cutting roller are provided in an operators cab mounted on the frame of the vehicle.

DRAWINGS

The above and other objects of the invention will become more apparent to those skilled in the art up on reference to the following detailed description in conjunction with the accompanying drawings wherein:

FIG. 5b is a cross-sectional view taken generally along lines 5b—5b of FIG. 5a;

DETAILED DESCRIPTION

Figure 1:
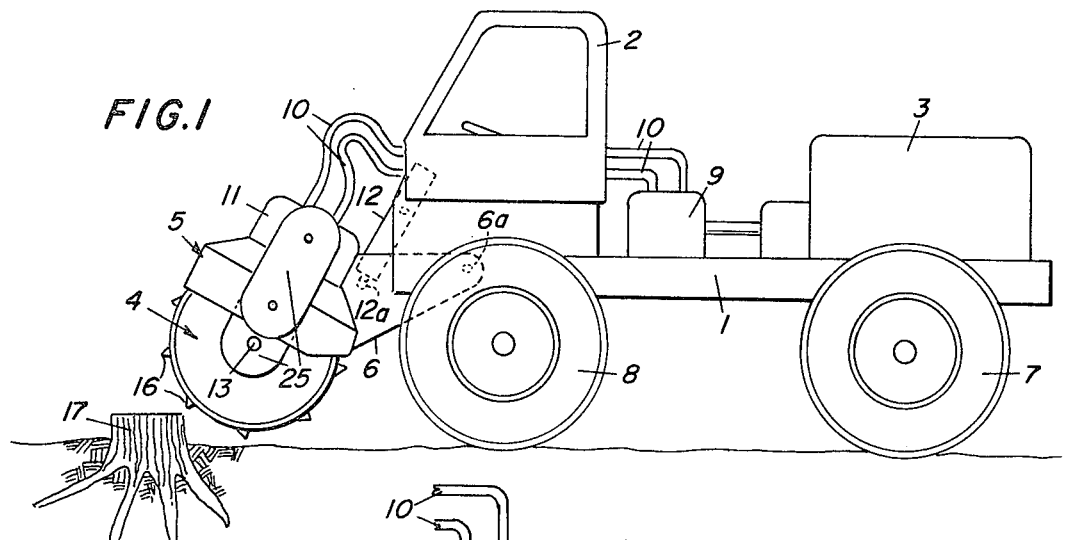
FIG. 1 is a side elevational view of apparatus embodying the present invention including a cutting roller incorporated on the front end of a vehicle and shown in raised position.

For illustrative purposes only, a wheeled vehicle embodying the present invention is shown in FIG. 1 as including a main frame 1 supporting an operator's cab 2 and a main drive motor 3 which may be a 220 horse power internal combustion engine for example. Frame 1 may have any suitable but strong construction formed by structional steel members but is important that is be capable of withstanding impact and vibration loads encountered during comminution of tree stumps as will be described. Close and across the front end of the vehicle, there is mounted a cylindrical milling or cutting roller or drum 4 journaled in an overlying framework 5 which may be termed a "carrier".

Carrier 5 is pivotally mounted to the vehicle at pivots 6a by means of a pair of parallel arms 6 (only one shown) which may take the form of steel plates. Carrier frame 5 is made from steel plate ½ to ¾ of an inch thick, and preferably includes V shape reinforcement plate 5b upstanding therefrom to also provide a support for mounting motor 11 for the drum 4. Additionally, the carrier arms 6 are positioned and mounted such that when in the fully raised position the carrier is positioned over the upper rear quandrant of drum 4 thereby exposing a substantial forward portion of drum 4.

The vehicle frame 5 is provided with large front and rear traction wheels 7 and 8 in tandem; rear wheels 7 being steerable while front wheels 8 are journaled on a nonswingable axis. Prefereably all wheels of the vehicle are driven by a main drive motor 3 via a hydraulic motor 33 shown schematically in FIG. 6. For example, this may be a hydrostatic drive with an infinitely variable transmission. In addition, main motor 3 drives a hydrostatic pump 9, which drives hydraulic or hydromotor 11 via hydraulic conduits 10, see FIGS. 2 and 7. As described above motor 11 is mounted on carrier frame 5 for cutting roller 4, and arms 6 which mount carrier 5 to the frame, are pivoted about horizontal axis 6a by means of a hydraulic cylinder 12 secured to the front of the vehicle frame at one end and the arms 6 at the other end at 12a.

Figure 7:
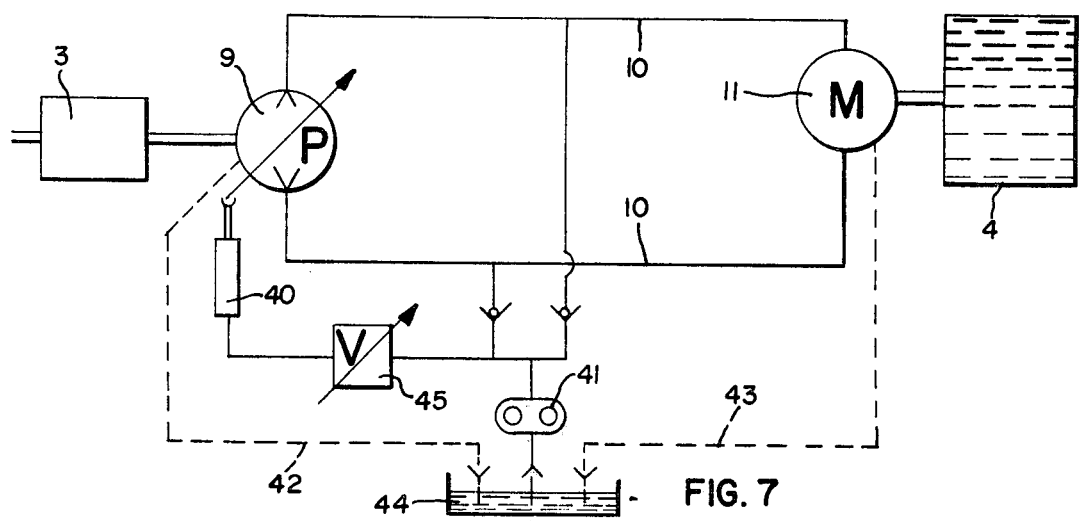
FIG. 7 is a diagrammatic view of the hydraulic circuit for driving the cutting roller in rotation.

In operator's cab 2 are provided two levers for changing the transmission ratios of the hydraulic drive for cutting roller 4. Also as illustrated in FIG. 7, the direction of rotation of cutting roller 4 may be reversed. Control lever is provided in the operator's cab for operating hydraulic cylinder 12, which is supplied with hydraulic liquid by a pump driven by main drive motor 3. From his seat in the cab, the operator can raise and lower milling roller 4 and also change its rotational speed by employing the infinitely variable hydrostatic drive. The vehicle may be driven over a range of speeds with very high driving power particularly at low speeds. The operational lever shifted by the operator for the speed and direction of movement of the infinitely variable hydrostatic drive, is pivotable in first and second opposite directions. Pivoting in the first direction effects a forward movement of the vehicle while pivoting in the opposite direction effects a reverse movement of the vehicle. The magnitude of the pivotal movement of the lever which, for example, may be a foot lever, determines the driving speed in all directions. In this manner, the driver can direct the movement of the vehicle very accurately and quickly.

Figure 2:
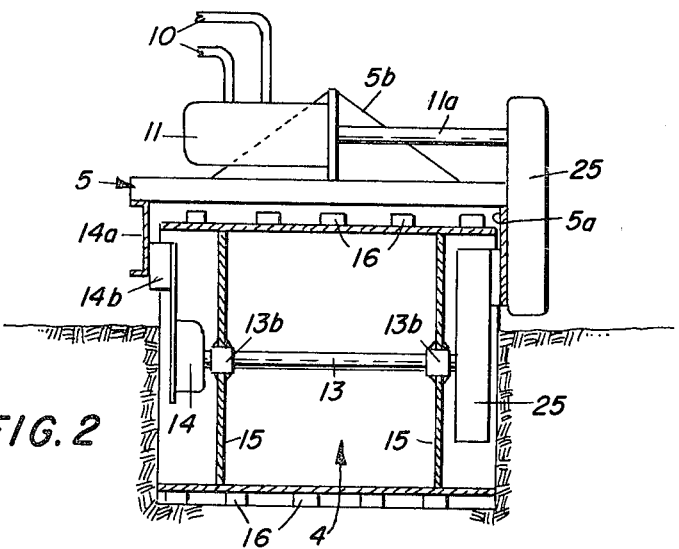
FIG. 2 is a front elevational view of the cutting roller and its carrier in lowered position below the ground surface and with the roller being shown in cross-section.

Hydraulic motor 11 for cutting roller 4 drives the latter via intermediate gear drives 25 which may, for example, be in the form of a spur gear drive. Motor 11 is rigidly mounted to the top surface of carrier 5 with its output shaft 11a extending to one end of carrier 5 in a horizontal plane where it is operatively connected to the spur gear drive assembly 25. The spur gears are housed in a tough steel shallow pan-like housing secured to carrier 5 and a vertical steel strap 5a depending from carrier 5. On one end of milling roller 4, intermediate drives 25 also form the support for shaft 13 of cutting roller 4 while on the other end, a bearing support 14 is provided. The latter is connected to carrier frame 5 by means of a steel strap 14a fixed to carrier 5 and steel bracket 14b fixed to the strap and bearing 14, as shown in FIG. 2 of the drawings. Rotation of shaft 13 is transmitted to roller 4 by means of collars 13b fixed to shaft 13 and also to plates 4a which extend from collars 13b to the wall of roller 4 where they are fixed thereto. In a preferred embodiment, the weight of carrier 5 with milling roller 4, drive 25 and motor 11 amounts to about 3,000 kg or in other units 3 tons, while the total weight of the vehicle including the roller and carrier is about 12.5 tons. The speed of cutting roller 4 is variable in the range of 0 to 200 revolutions per minute and more and in use cutting roller 4 is operated at about 200 revolutions per minute.

In FIG. 2 it can be seen that the two end faces 15 of cutting roller 4 are disposed inwardly of the end edges of the cylindrical wall of the roller to define recessed areas at each end. These recesses house drive 25 and bearing 14 to prevent damage thereto while permitting the cutting roller to be sunk a substantial distance below the ground surface. Strap connectors 5a and 14a for these parts extend from the recesses toward the carrier 5 but in an area which is considerably above roller shaft 13. FIG. 2 illustrates how the roller recesses permit the roller to be moved below the ground surface during a comminuting operation above the shaft 13.

Figure 5A:
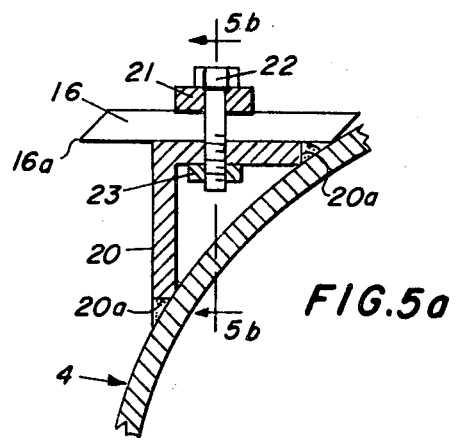
FIG. 5a is a cross-sectional view of one of the cutting knives on the roller as well as the mounting therefor.
Figure 5B:
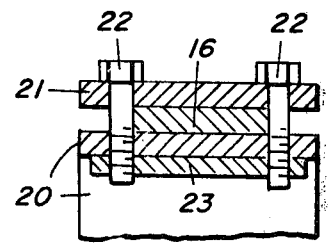

FIG. 5a is a cross-sectional view of one embodiment of a knife assembly which may be used on cutting drum. It includes knives 16 adjustably secured to steel right angles 20, which are welded at along their extemities 20a to the peripheral surface of roller 4. A clamp in the form of a steel plate 21 is fastened by bolts 22 extending through bored holes in one side of angle 20, with a counter-clamp 23 having a threaded opening receiving bolt 22 to hold cutting knife 16 firmly as shown in FIG. 5b. To adjust or to exchange knives 16, bolts 22 are simply removed or loosened; it being understood that bolts 22 straddle the opposite sides of knife 16 as shown in FIG. 5b. Knives 16 are made out of spring steel bars which may contain Selesium. The opposite ends of each knife 16 are formed into bevel cutting edges, so that the knife can be turned around after one edge becomes worn.

Figure 9:
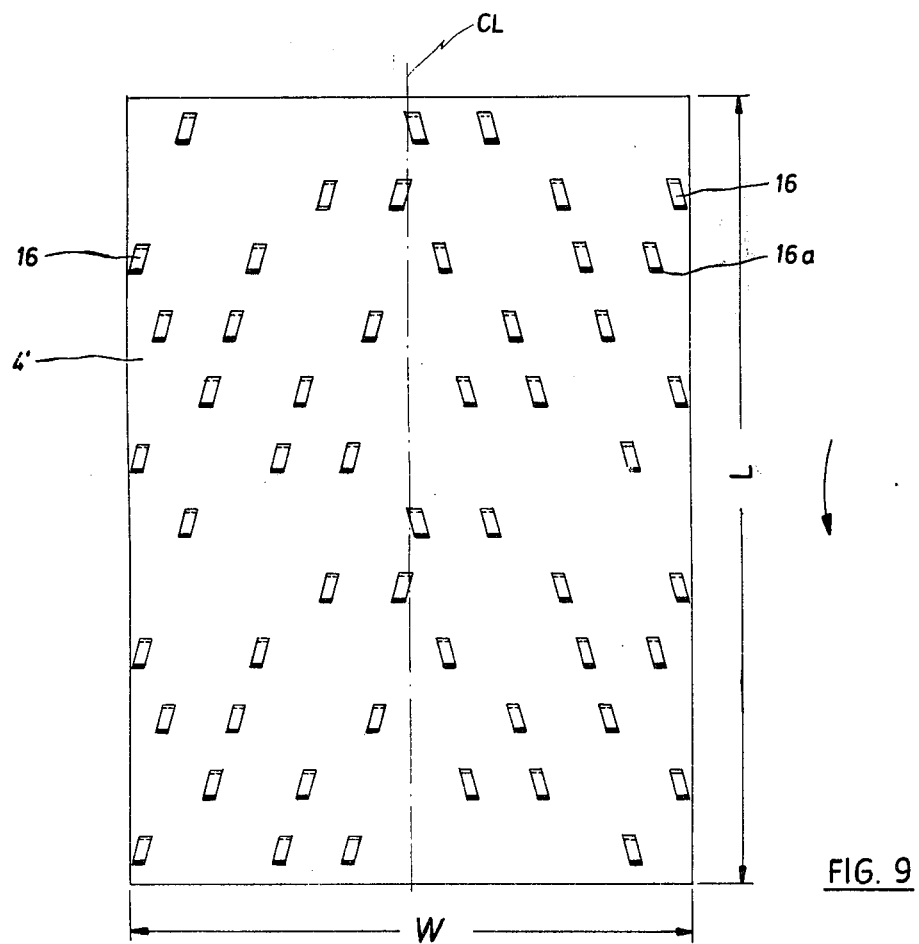
FIG. 9 is a diagrammatic plan view of a preferred embodiment of a cutter drum developed along its circumferential length to show the number, position and arrangement of knives thereon.

In FIG. 9 there is shown a developed view of a prefered cutting roller 4' having a width, W, measured along the rotational axis, of 47 inches and circumferential length, L, of approximately 123 inches. Cutting edges 16a of the knives are bevelled and extend in horizontal planes parallel to the axis of the drum. In this specific embodiment, fifty two cutting knives are employed. As is clearly illustrated in FIG. 9, knives 16 are arranged in a staggered overlapping pattern so that continuous cutting of the stump along the entire W or width dimension of the roller occurs during each revolution of roller 4. This avoids the need of long or excessive numbers of knives which would require much greater pressure against the stump causing the drum to periodically heave and stop rather than cutting smoothly and continuously.

In the preferred embodiment, knives 16 have a cutting edge 16a of approximately two and three eights of an inch wide and a thickness of approximately five eighths of an inch and are made from spring steel for toughness to avoid chipping or breakage when encountering the tough stump material. More specifically knives 16 are made from spring steel preferably containing Selesium. In the preferred embodiment shown, the number and arrangement of knives 16 throughout one half of the drum's circumference is identical to that in the other half. This may be noted upon viewing FIG. 9 wherein the lower half section contains the same number and arrangement of knives as the upper half section. It will also be noted from FIG. 9 that continuous cutting on the stump across the entire W dimension of the drum occurs twice for each revolution of the drum. In other words two continuous scores or cuts extending the length of the drum dimension W will be made for each revolution of the drum.

In accordance with another feature of the present invention, all the knives on left half section of the drum 4' extend outwardly at an angle of about 30° to a diametrical plane of the drum, one such plane being illustrated in FIG. 9 by CL, passing through the center of the drum. All the knives 16 on the right half section of the drum extend outwardly at the same but oppositely directed angle of 30° as shown in FIG. 9. This ensures that the drum will be balanced and stay properly positioned at the center of the stump during a chipping operation. Moreover should, for example, only the right half section of the drum engage the stump, the angular orientation of knives 16 will produce a lateral force moving the drum to the right to position more of the drum on the stump. The same action will occur conversely should only the left hand side of the drum be positioned on the stump.

Figure 10:
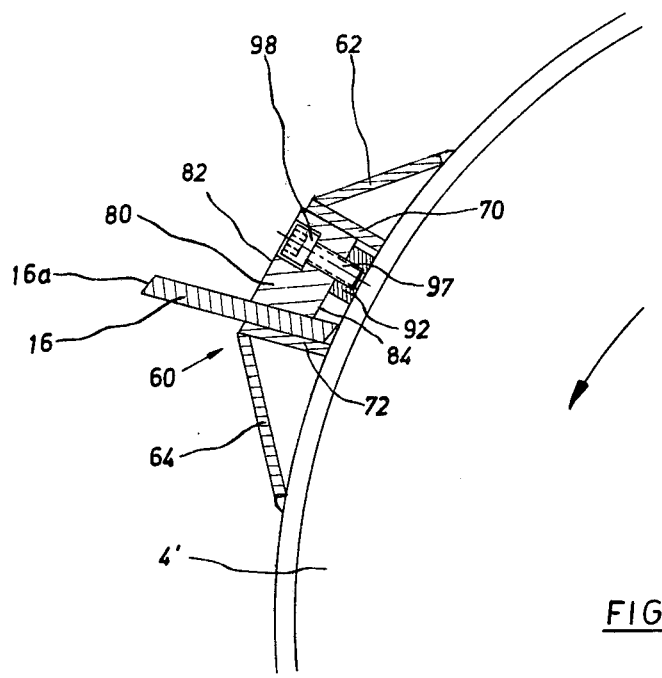
FIG. 10 is an end view of the preferred embodiment of the drum with portions of the drum removed and with a cutter-knife assembly shown in cross-section.
Figure 11:
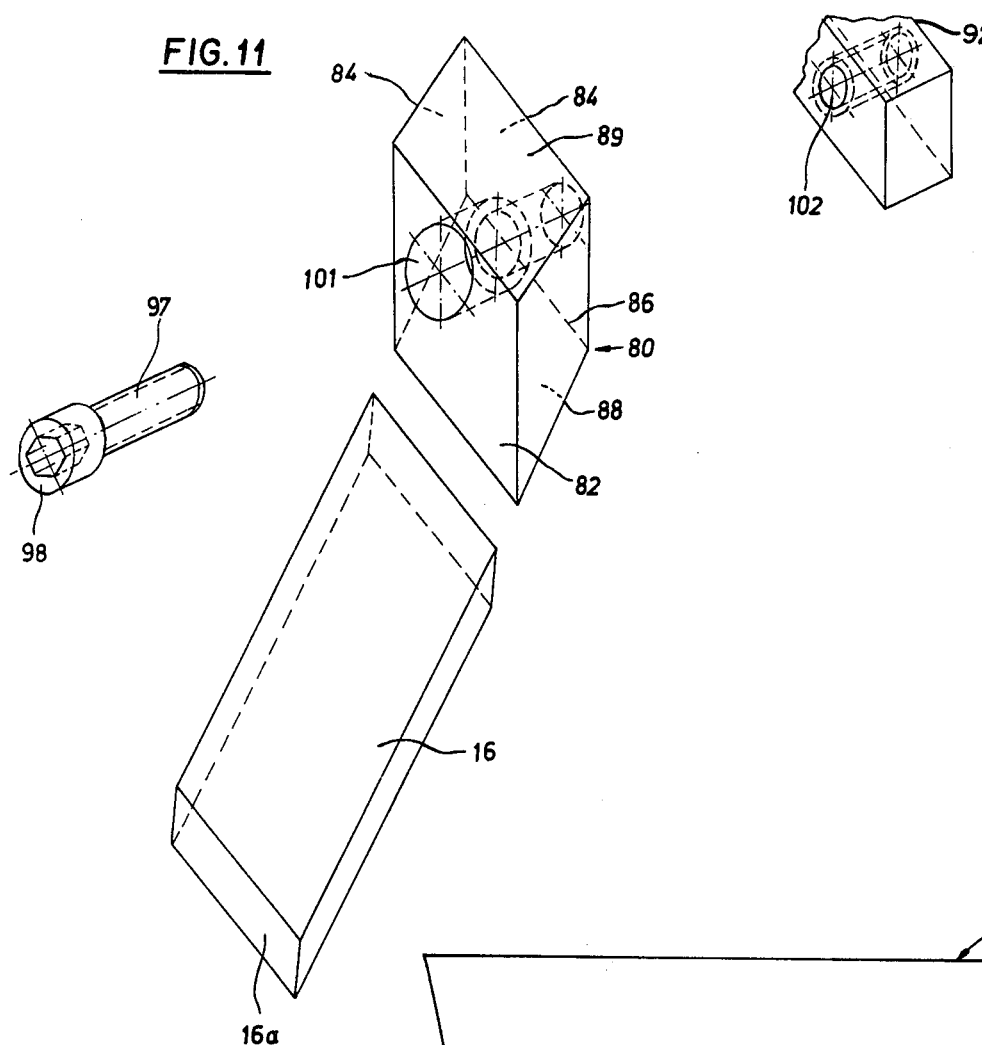
FIG. 11 is an exploded perspective view of parts of a knife- and holder assembly included in the preferred embodiment of the drum of FIGS. 9 and 10.
Figure 12:
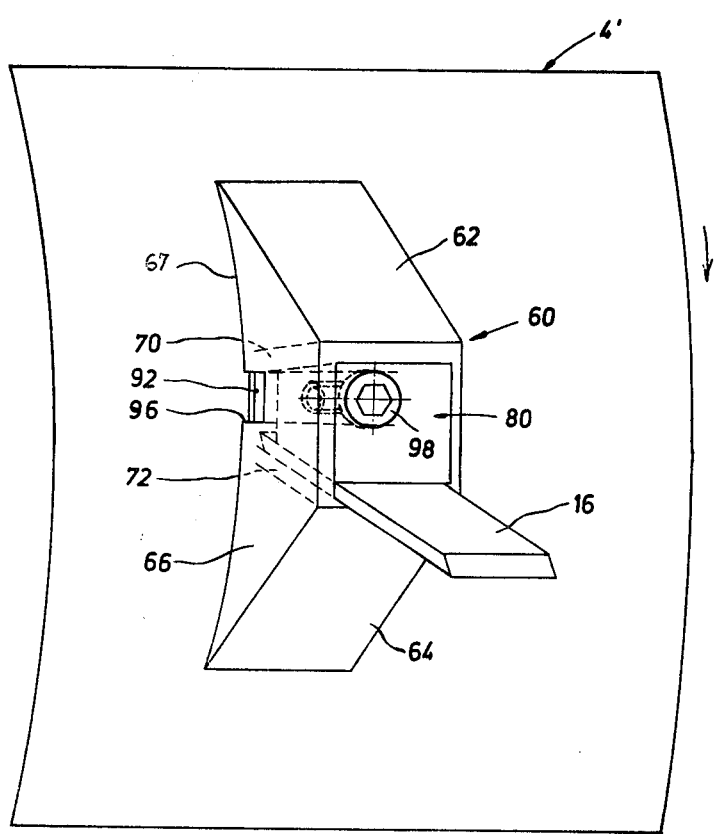
FIG. 12 is a perspective view of a knife- and holder assembly included in the preferred drum embodiment with only a portion of the drum being shown and with other knife- and holder assemblies omitted for clarity.

Referring now to FIGS. 10, 11 and 12, a preferred knifeholder assembly generally designated as 60 is illustrated for releasably securing knives 16 on the cutter drum 4'. This assembly includes a holder formed by upper and lower outwardly converging walls 62 and 64 each in the form of a parallelogram, and opposite parallel side walls 66 and 68 extending at an angle of about 30° to a diametrical plane of cutting roller 4' and having a generally trapezoidal configuration except for edge 67 which is curved to fit the cylindrical shape of roller 4'. Holder 60 is rigidly secured to the periphical surface of drum 4' in a position shown in FIGS. 10 and 12 by welds extending along the edges of the upper and lower walls 62 and 64 and edges 67 of side walls 66 and 68. The welds along upper walls 62, 64, are illustrated in FIG. 10, but omitted from FIG. 12 for clarity. Holder side walls 66 and 68 together with interior overlying walls 70 and 72 fixed to the side walls, define a passage of rectangular cross-section for receiving knife 16 against the lower interior wall 72, as shown in FIG. 10. Knife 16 projects from the holder at an angle of about 68° to a line tangent to the drum at the inner edge of the knife 16. Additionally knife 16 projects from the holder a distance of approximately 1 ½ inches, however, this may be varied. Lower interior wall 72 in the holder extends at an angle of about 22° relative to the upper interior wall 70 to define what may be termed a tapered passage in the holder.

For securing knife 16 in the holder passage, a steel wedge block generally designated 80 is employed having parallel front and rear faces rectangular 82 and 84, parallel side faces 84 and 86 having a parallelogram shape and extending 30° to the front face 82. Bottom face 88 of wedge 80 extends at an angle of about 22° to top face 89. Wedge 80 thus matches the angular configuration of the holder passage such that when inserted therein above knife 16 and forced therein, it will wedge the knife firmly against lower interior wall 72 as shown in FIG. 10.

To releasably secure wedge 80 in the holder, an anchor member in the form of a rectangular steel bar 92 is inserted across the rear of the holder through slots 96 preformed in holder side walls 66 and 68 as best shown in FIG. 12. Wedge block 80 is provided with a counter sunk passage 101 extending between its front and rear faces 82 and 84 for receiving a threaded bolt 97 received in a threaded passage 102 formed in anchor block 92. Bolt 97 has an enlarged head 98 of the "allen" head type recessed in the counter sunk portion of the passage through wedge 80. It will be seen that by tightening bolt 47 in anchor block 92, the wedge will firmly clamp knife 16 in the holder against movement, despite heavy impact forces imparted thereto when in use during a stump comminuting operation. To facilitate tightening and loosening of bolt 97 a hexagonal key may be placed into the hexagonally recessed head 98 of bolt 97 for turning the same.

Although FIGS. 10, 11 and 12 show a right-handed knife holder assembly, the left-hand holder assembly will be similarly formed, but with the holder side walls extending at an opposite 30° angle toward the left end of the drum. Also in the preferred embodiment, the rear edge of knife 16 opposite edge 16a is also provided with a bevel cutting edge so that either edge may be employed as the cutting edge. It should be understood that each of the 52 knives employed on the drum 4' will have its own holder similar to that described above.

Figure 3:
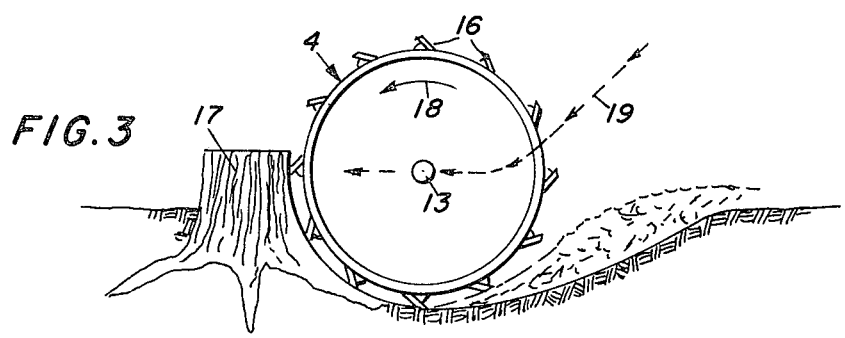
FIG. 3 is a diagrammatic side elevational view of the cutting roller in operation against a tree stump.
Figure 4:
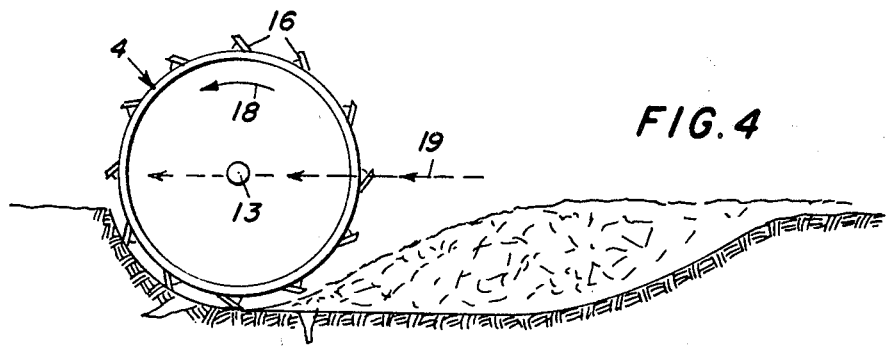
FIG. 4 is a view similar to FIG. 3, but after the tree stump is entirely comminuted.

In FIGS. 3 and 4 the method of comminuting a tree stump 17 with roots in the soil is illustrated. Milling or cutting roller 4 on cutting in a direction indicated by arrow 18 is partially driven below the soil or ground surface in front of tree stump 17 usually at least as deep as the planting depth for a new cultivation, for instance thirty cm. In this position the vehicle is driven against the side of the stump 17 so that the cutting knives 16 cut chips from the stump 17. Cutting knives 16 attack and engage the stump at the front side of milling roller 4 while primarily moving from top to bottom portions of the stump, i.e., the wood is chipped or splintered primarily in the longitudinal direction of the fibers.

FIG. 4 shows cutting roller 4 in position after fully comminuting the stump. The path of cutting roller 4 during the cutting operation is indicated in FIGS. 3 and 4 by dotted line 19 which in FIG. 3 first extends at an angle and then extends generally horizontally. It will be noted that the roller although moving against the side of the stump also exerts a downward force on the stump which by virtue of the great weight of the drum and force of the vehicle substantially limits movement of the stump during the cutting operation.

As illustrated by the arrows in FIGS. 3 and 4, during operation the milling roller 4 is moved forward against the side of the stump as it is lowered into or towards the ground and continues to move forward. The roller is then raised and the above motion repeated throughout the course of an entire comminuting operation. The forward speed of the vehicle during the attack of the milling roller 4 on the stump can be adjusted downwardly to a complete stop, if necessary, in response to the load on the roller. However, during normal operation, the roller travels at the speed of approximately 200 revolutions per minute or more while being forced against the stump by the weight of the vehicle and the drum as well as the force of the vehicle moving against the stump.

The slices and chips of wood from the tree stump as well as the soil picked up by cutting knives 16 are thrown to the rear by the milling roller 4 where most of it refills the depression in the ground made by the milling roller while, a lesser portion is thrown up. To prevent excessive throwing up of the soil and wood chips, it is possible to attach a baffle plate (not shown) to the front of the vehicle or the rear of the carrier 5 to deflect the soil and chips downwardly.

In actual practice of the method and apparatus of this invention, tree stumps have been entirely comminuted in quick succession without interruption in a matter of minutes, for example 2 to 5 minutes depending upon the stump size. Moreover in situations where the stumps are very small, for example 4 to 8 inches in diameter the method and apparatus of the present invention will successfully comminute the entire stump in less than a minute.

Hydraulic cylinder 12 supports the position of cutting roller 4 relative to the vehicle, so that the reaction forces acting upward seek to lift the vehicle at its front end. However these forces are overcome by the great weight of the roller and the vehicle at the front end so that the milling roller is pressed downward with maximum force against the stump. Additionally during operation, there are no significant horizontal or lateral force components inasmuch as the force exerted on the drum is in a vertical direction and the drum itself is balanced by virtue of the knife configuration described above. This ensures that the milling roller is maintained in proper position in engagement on the stump. Additionally any lateral forces tending to overturn the vehicle are avoided in contrast to devices of the prior art.

Figure 6:
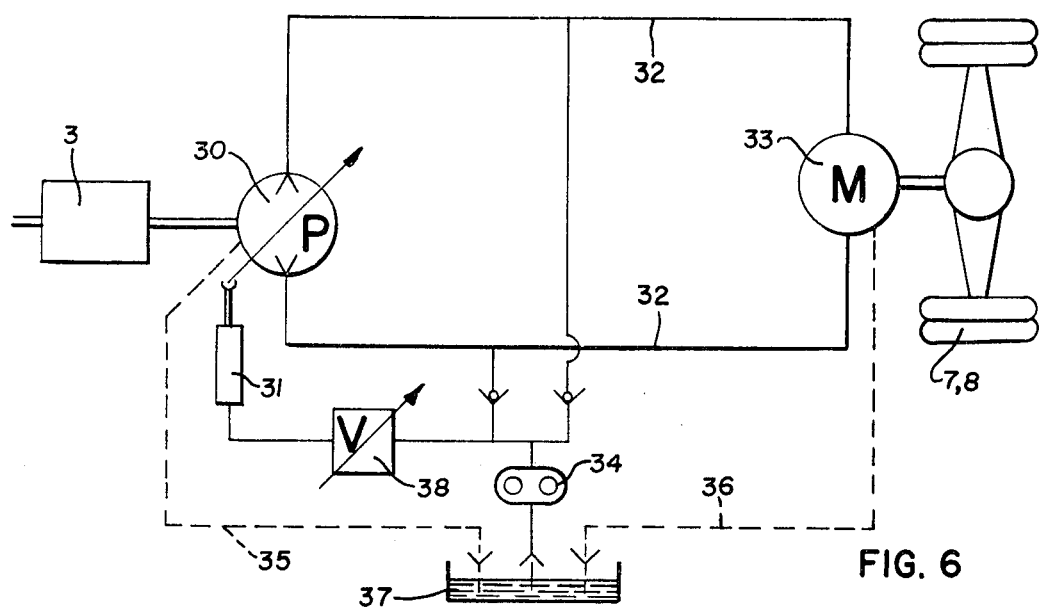
FIG. 6 is a diagrammatic view of a hydraulic circuit for driving the vehicle over the ground surface.

In FIG. 6 the structure of the hydrostatic drive for driving the wheels of the vehicle are diagrammatically illustrated. The main drive motor 3 drives the axial piston pump 30, which can be adjusted continuously by means of a hydraulic cylinder or piston 31, in both directions of movement which can be easily controled with a pedal provided in the cab of the vehicle. Lines 32 connect the pump 30 with an axial piston fixed displacement motor 33, which drives wheels 7 and 8 of the vehicle. The waste oil from pump 30 and motor 33 flows back through lines 35 and 36 into a container 37 where a pump 34 returns it to line system 32. In addition, the pump 34 supplies, via a control valve, the hydraulic cylinder or piston 31, which varies the output of the pump 30. Direction of the drive of the wheels in both turning directions takes place by adjustment of the valve 38.

The hydraulic circuit for driving the milling roller 4, represented diagrammatically in FIG. 7, is similar to the circuit shown in FIG. 6. The axial piston pump 9, which is driven by the main drive motor 3, is equipped for flow in both directions of movement. The output of the pump 9 is varied by means of a hydraulic cylinder or piston 40. In this circuit, too, the filling pump 41 supplies the lines 10 with hydraulic liquid, to compensate for the waste oil losses of the pump 9 and the motor 11. The waste oil is returned to storage container 44 via lines 42 and 43. The filling pump at the same time also delivers the hydraulic liquid for activating the adjustment cylinder or piston 40 by means of a control valve 45. Thereby the rotational speed of the roller 4 can be adjusted in both turning directions on a continuous basis.

Figure 8:
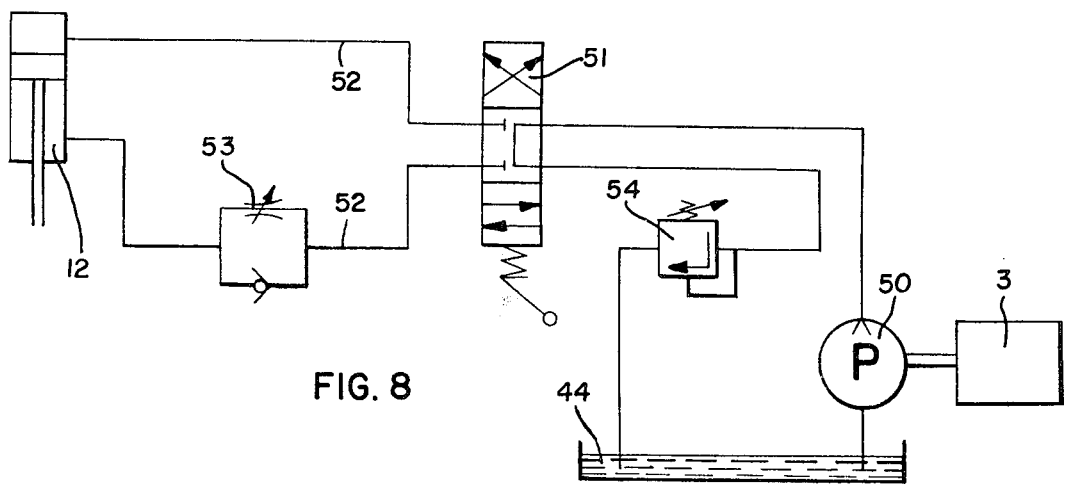
FIG. 8 is a diagrammatic view of a hydraulic circuit for raising and lowering the cutting roller.

FIG. 8 shows diagrammatically the hydraulic system for lifting the milling roller 4 and the frame 5. A pump 50 similarly driven by the main drive motor 3 drives the hydraulic cylinder 12 via a multiple valve 51 acting as control valve. The control valve 51 has three positions: raising, lowering and stop.

In one of the lines leading to the hydraulic cylinder 12, there is an adjustable quantity control valve 53. In the line leading back from the control valve 51 to the container, there is a counter pressure valve 54, which keeps pressure on the low pressure side to a minimum. Instead of directly coupling the pump 50 with the main drive motor 3, it is also possible to provide a separate electrical drive motor for the pump, which runs at a constant speed thereby avoiding dependence of the lifting rate of the milling roller 4 on the rate of revolutions of the main drive motor 3.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

Moreover although shown in connection with comminuting tree stumps, the present invention may also be employed with or without modification, to chip or break other substance or articles, such as for example asphalt paving. The invention therefore need not be limited in every aspect to stump comminuting.

What I claim is:

1. A method of comminuting a tree stump employing a heavy cylindical cutting roller having a plurality of spaced cutting knives projecting throughout its peripheral surface; the steps comprising, rotating the roller at high speed and moving it forwardly against the side of the stump with the knives moving from an upper portion of the stump to a lower portion of the stump to cut chips from the stump generally along the grain of the stump.

2. The method defined in claim 1 further including the step of moving the roller towards the bottom of the stump and progressively moving the roller forwardly across the stump as the cutting proceeds and repeating the same until the stump is fully comminuted.

3. The method defined in claim 2 wherein before initially engaging the stump, at least part of the roller is lowered below the ground surface.

4. The method defined in claim 1 wherein before initially engaging the stump at least part of the roller is lowered below the ground surface.

5. The method defined in claim 1 wherein the roller is rotated at a speed exceeding 150 revolutions per minute.

6. The method defined in claim 5 wherein the roller is rotated at a speed of approximately 200 revolutions per minute.

7. The method defined in claim 5 employing a cutting roller whose weight including accessory operating parts is in excess of 2 tons.

8. The method defined in claim 2 wherein the cutting roller is moved forwardly against the stump in a direction at right angles to the axis of rotation of the roller.

9. The method defined in claim 1 employing a cutting roller mounted in a carrier frame and rotating the roller through means of a hydraulic motor mounted on the carrier frame, and moving the roller vertically and horizontally by moving the carrier frame.

10. The method defined in claim 7 wherein the roller is mounted to the front end of a vehicle weighing in excess of 7 tons and the roller is urged forwardly against the stump by moving the vehicle toward the stump.

11. The method defined in claim 1 wherein the roller is mounted to the front of a vehicle and is advanced against the stump by moving the vehicle toward the stump.

12. The method defined in claim 1 employing knives staggered on the roller with the knives in the right half section of the roller extending outwardly at an angle towards the adjacent end of the drum, and the knives on the left-hand section of the roller extending at the same but oppositely directed angle toward the adjacent end of the roller.

13. The method defined in claim 8 wherein the axis of rotation of the roller lies in a horizontal plane.

14. The method defined in claim 1 further including the step of moving the cutting roller downwardly as well as laterally and forwardly against the stump.

* * * * *